3,075,941
COPOLYMER COMPRISING A VINYL POLYSILOX-
ANE, AN UNSATURATED POLYESTER ESTER
RESIN AND A VINYL COMPOUND, AND COAT-
ING COMPOSITION THEREOF
John Wynstra, Berkeley Heights, N.J., and Bruce Eugene
Godard, Dobbs Ferry, N.Y., assignors to Union Car-
bide Corporation, a corporation of New York
No Drawing. Filed Oct. 3, 1957, Ser. No. 687,857
7 Claims. (Cl. 260—33.6)

This invention relates to organo polysiloxane copoly-
mers and to a process for the production thereof.

Attempts have been made to copolymerize an organo
polysiloxane with a polyester in order to obtain a reac-
tion product possessing desirable properties of both the
polysiloxane and polyester. Hitherto, such attempts have
been unsuccessful as these copolymers are difficult to pre-
pare, tending to gel during their preparation.

We have now found that by reacting an organo poly-
siloxane containing reactive vinyl groups, a polyester con-
taining residues of an olefinically alpha, beta unsaturated
dicarboxylic acid, and a monomeric vinyl compound, an
organo polysiloxane copolymer can be obtained having
desirable properties of both the organo polysiloxane and
the polyester. These copolymers are especially valuable
in the preparation of surface coatings having excellent
heat, water and weather resistance, good color and gloss
retention and good film integrity.

The organo polysiloxane copolymers of this invention
comprise a reaction product of an organo polysiloxane
containing reactive vinyl groups, a polyester containing
an average of between 0.1 and 1.0 of an olefinically alpha,
beta unsaturated dicarboxylic acid residue per polyester
molecule, and at least one monomeric vinyl compound.

By the term organo polysiloxane as used herein is
meant a silicone polymer comprising silicone atoms inter-
connected by —Si—O—Si linkages and containing vinyl
groups attached to the silicon atoms, wherein the ratio of
the sum of the monovalent hydrocarbon groups attached
to the silicone atoms is about 1–1.6 per each silicon atom.

The organo polysiloxanes useful in the practice of this
invention are characterized by a preferable ratio of alkyl,
aryl and vinyl groups to the silicon atoms as tabulated
below:

Alkyl to Si—0 to about 0.6 per silicon atom,
Aryl to Si—about 0.75 to 1.25 per silicon atom,
Vinyl to Si—about 0.05 to 0.2 per silicon atom,
Total hydrocarbon groups—about 1 to 1.6 per silicon
atom.

We have found that an organo polysiloxane having an
alkyl to silicon ratio in excess of about 0.6 to 1 results in
a copolymer, upon reaction with a polyester and vinyl
monomer, which when utilized as a coating has poor heat
stability and homogeneity. A copolymer having poor
homogeneity is characterized by cloudiness, and also in
some instances the reacted products are exceedingly in-
compatible, and the product separates into distinct layers.
Employing organo polysiloxanes wherein the aryl to sili-
con ratio is less than about 0.75 to 1 also impairs the
homogeneity of the copolymers whereas a ratio of aryl
to silicon of greater than about 1.25 to 1 results in a
copolymer having an undesirable brittleness. Copolymers
that have been produced using an organo polysiloxane
having a vinyl to silicon ratio of less than about 0.05 to 1
are exceedingly soft and have a tendency toward cloudi-
ness and lack of homogeneity. On the other hand, where
the vinyl to silicon ratio has exceeded about 0.2 to 1, the
copolymer reactions are difficult to control due to the
tendency toward gelation.

The sum of the hydrocarbon groups, alkyl, aryl and
vinyl, should bear a ratio to the silicon atoms of between
about 1 to 1 and 1.6 to 1. A ratio higher than about
1.6 to 1 results in a product containing unreacted compo-
nents as indicated by the exudation of an oily substance
when the copolymer is used as a coating. A ratio greater
than about 1.6 to 1 also results in a product which gives
an undesirable increased volatility to varnish coating
compositions. A ratio of less than about 1 to 1 results
in a copolymer which is exceedingly brittle and is insoluble
in organic solvents.

The organo polysiloxanes are, as is known in the art,
usually prepared by hydrolysis and condensation of chlo-
rosilanes, or alkoxysilanes to form the corresponding poly-
siloxanes. The organo polysiloxanes used in this inven-
tion generally are prepared by a co-hydrolysis and co-
condensation of a vinyl chlorosilane or vinyl alkoxysilane
with an arylchloro- or arylalkoxysilane and/or an alkyl-
chloro- or alkylalkoxysilane wherein the ratios of mono-
valent hydrocarbon groups per each silicon atom is within
the ranges previously described.

Specific examples of the organo silane compounds
which have been found suitable for the preparation of
the organo polysiloxanes include, but are not limited to,
the following compounds: Phenyltrichlorosilane, methyl-
phenyldichlorosilane, dimethyldichlorosilane, vinyltri-
chlorosilane, phenyltrimethoxysilane, phenyltriethoxy-
silane, methylphenyldimethoxysilane, methylphenyldi-
ethoxysilane, dimethyldimethoxysilane, dimethyldieth-
oxysilane, diphenyldimethoxysilane, diphenyldiethoxy-
silane, vinyltrimethoxysilane, vinyltriethoxysilane, and
vinylmethyldichlorosilane.

To reiterate, the organo polysiloxanes are produced by
a conventional co-hydrolysis and co-condensation reac-
tion. By way of illustration, a mixture of silanes, wherein
the ratio of the hydrocarbon groups to the silicon atoms
is within the preferred range as previously described, is
slowly added, with agitation, to a mixture of an organic
solvent and water, for example—isopropylether and water.
The amount of water is at least sufficient to hydrolyze the
silanes. The temperature of the reaction mixture is kept
below 50° C. at all times. The organo silanes are hydro-
lyzed, with hydrogen chloride or alcohol being formed in
the reaction, depending on whether a chlorosilane or
alkoxysilane was used as the starting material. The
hydrolyzed silanes go into solution in the organic layer.
The organic layer is separated from the water layer by a
simple decantation step and is then washed with water.
The hydrolyzed silanes are thereafter subjected to dis-
tillation under moderately reduced pressures at 65° C.
whereby the organic solvent and other volatiles are elimi-
nated. The hydrolyzed silanes are then admixed with an
amount of toluene sufficient to obtain a solution of about
70–75 percent solids content. The solution is refluxed
for about 2½ to 3 hours at a temperature of about 110°
C. At the end of this time, as indicated by a conven-
tional hydroxyl content test, about 90 percent of the
silanol groups have condensed.

The resultant organo polysiloxane solutions, prepared
as described in the preceding paragraph have a viscosity
ranging from about 100 to 1000 centipoises at 25° C. and
also have the same ratios of the hydrocarbon groups to
silicon atoms as did the starting materials.

The polyester reactants that are used in preparing the
organo polysiloxane copolymers of this invention com-
prise a mixture of fusible, soluble esterification reaction
products of olefinically alpha, beta unsaturated dicar-
boxylic acids and saturated aliphatic and/or aryl dicar-
boxylic acids with a polyhydric alcohol wherein the poly-
esters contain an average of between 0.1 and 1.0 alpha,
beta unsaturated dicarboxylic acid residue per average
polyester molecule, have a molecular weight on the order of 1000–2500 and have an acid number of less than about 50.

The alpha, beta unsaturated dicarboxylic acid residue per polyester molecule is kept at an average value of at least 0.1 in order to provide a sufficient number of potentially reactive points capable of reacting with the vinyl monomer.

The greater the average number of such residues per polyester molecule, the greater likelihood there is for reaction between the polyester and the vinyl monomer, which by reacting with both the polyester and organo polysiloxane through the alpha, beta unsaturated acid groups of the polyester and the vinyl groups of the polysiloxane, serves as a link or bridge between the two. If the alpha, beta unsaturated dicarboxylic acid residue is below 0.1 per polyester molecule, there is an incomplete linking of the polyester and polysiloxane upon copolymerization of the polyester, polysiloxane and vinyl monomer and the resultant organo polysiloxane copolymer would contain incompatible products which would separate into distinct layers. On the other hand, if the alpha, beta unsaturated dicarboxylic acid residue is greater than an average of one per polyester molecule, the organo polysiloxane copolymers obtained, using such polyesters, are infusible insoluble products due to excessive cross linking involving the polyester, polysiloxane and the vinyl monomer.

Generally the molecular weight of the polyester is on the order of 1000–2500. A molecular weight on this order is not critical but is, however, desirable. It has been found that a polyester product having a molecular weight of between 1000–2500 comprises a mixture of long chain products which, containing more reactive positions than shorter chain products, are more likely to link to the organo polysiloxanes.

In order to build up the molecular weight of the polyester to about 1000 and 2500 while keeping the olefinically alpha, beta unsaturated acid content between an average of 0.1 to 1.0 per polyester molecule, saturated aliphatic and/or aryl dicarboxylic acids are admixed with the alpha, beta unsaturated dicarboxylic acids and the mixture esterified.

The average number of alpha, beta unsaturated acid residues per polyester molecule, sometimes referred to as the alpha, beta unsaturated acid functionality, is calculated with the aid of the following equation:

$$G = \frac{M}{N - (2M + 2P + A)\left(1 - \frac{Q}{Q^0}\right)}$$

wherein:

G is the average number of olefinically alpha, beta unsaturated dicarboxylic acid residues per polyester polymer molecule;

M is the number of moles of olefinically alpha, beta unsaturated dicarboxylic acid;

N is the total number of moles of reactants (i.e.— moles of the polyhydric alcohol, dibasic acids, and, if used, monobasic acids, which modify the properties of the organo polysiloxane copolymer);

P is the number of moles of dicarboxylic acids that are free of olefinic unsaturation;

A is the number of moles of monocarboxylic acids;

Q is the acid value of the polyester polymer;

$Q^0$ is the acid value of the mixture prior to any esterification.

Where the reaction mixture contains a fatty oil rather than a monobasic acid as a modifier, the same equation may be used to calculate G. In this case, A is zero and N is defined as the total number of moles of polyhydric alcohol, dibasic acids and oil.

The degree of esterification at any time during the course of the reaction is the ratio of ester groups formed to the total number of available dibasic acid carboxyl groups at the start of the reaction and can be expressed mathematically as $$1 - \frac{Q}{Q^0}$$

where Q is the acid number value at any given reaction stage and $Q^0$ is the calculated acid number value of the total dibasic acids in the reaction mixture prior to initiating esterification.

The acid number value is the number of milligrams of alcoholic KOH required to neutralize a gram sample of the material with phenolphthalein as indicator. The end point with phenolphthalein is the typical pink color developed at a pH of about 9 to 10. The pink color is fugitive with these polyesters but nevertheless is of sufficient duration to be recognized.

As previously stated, the reactants which are used to prepare the polyester polymers are combined in such proportions and reacted to such a degree of esterification as to yield a mixture of fusible, organic soluble polyesters having a calculated average of between 0.1 to 1.0 alpha beta unsaturated acid residues in the average polyester molecule and a reasonably complete esterification of polyhydric alcohols and dibasic acid as indicated by an acid number of less than about 50 and preferably between about 10 and 30.

A polyester polymer having an acid number in excess of about 50 is undesirable for an organo polysiloxane copolymer made from such a polyester has poor water and alcohol resistance and furthermore the copolymer would react with basic pigments, which are used in certain coating compositions, through the free polyester acid groups to form an insoluble, infusible product.

The polyester polymers are generally produced by heating the reactants in the presence of a solvent such as xylene at elevated temperatures on the order of about 160–200° C. The mixture is refluxed with agitation and the water formed, continuously removed. The esterification reaction may be conducted in an inert atmosphere in order to insure against discoloration of the product. Usually the esterification reaction is complete in about 6–10 hours. The completion of the reaction is indicated by noting the change of the acid number of the reaction mixture from its initial value ($Q^0$) to the value corresponding to that of the desired polyester polymer (Q).

A suitable polyester has an average alpha, beta unsaturated acid functionality of between 0.1 and 1; a color on the 1933 Gardner scale of from 2 to 6 and an average molecular weight of between about 1000–2500.

Among the olefinically alpha, beta unsaturated dicarboxylic acids used to prepare the polyester polymers may be mentioned maleic, chloromaleic, citraconic and itaconic acids and anhydrides thereof and also fumaric acid. Combinations of these acids and acid anhydrides can also be used.

The saturated dicarboxylic acids which have been found satisfactory for building up the polyester molecule include the saturated aliphatic dicarboxylic acids having the formula

$$HOOC(CH_2)_nCOOH$$

wherein n is a whole number more than one, for example, adipic, succinic, sebacic and glutaric. Illustrative of the aryl dicarboxylic acids are phthalic, terephthalic, and chlorophthalic.

The anhydrides of these acids are also satisfactory.

These acids or acid anhydrides may be used singly or in combination of two or more.

Saturated and unsaturated monocarboxylic acids can be admixed with the alpha, beta unsaturated dicarboxylic acids and the saturated, aliphatic or aryl dicarboxylic acids described above prior to esterification. A polyester polymer containing these monobasic acids modifies the physical properties of the organo polysiloxane copolymer.

For example, if it is desired to obtain a copolymer having excellent air drying qualities, the polyester should contain a monobasic acid derived from a drying or semi-drying oil. The drying oil or semi-drying oil acids are highly unsaturated and the "drying" is apparently due to the oxidation of the unsaturated acids. Coating compositions of our organo polysiloxane copolymers prepared from these drying fatty acid modified polyesters form tough, hard films when exposed to air.

On the other hand, if a coating composition having an optimum in heat resistance is desired, "non-drying" acids (i.e. those having a low degree of unsaturation, as indicated by low "iodine" values or no unsaturation) are the best choice. The amount of modifying acids will vary, depending on the properties desired.

Illustrative of suitable modifying acids may be noted the higher fatty acids such as lauric, oleic, linoleic; the alkanoic acids such as 2 ethyl hexanoic, decanoic, undecanoic; and the monobasic acids derived from drying, semi-drying and non-drying oils, such as coconut, soya and linseed oil.

The modifying acids may be used singly or in combination of two or more.

Modification of the polyester with fatty acids containing conjugated carbon to carbon double bonds is generally unsatisfactory since such polyesters tend to gel in preparation.

However, such fatty acids can be employed, if they constitute not more than about 5 percent by weight of the total fatty acids used to modify the polyester, without incurring gelation.

The polyhydric alcohols which are used to esterify the acid groups may be the diols such as diethylene glycol and 2-ethylhexane diol 1-3; the triols such as glycerol; or the more highly functional polyols such as pentaerythritol or sorbitol. The polyhydric alcohols may be used singly or in combination of two or more. The polyhydric alcohol or alcohols are so chosen as to provide at least one hydroxy group for each available carboxyl group.

Among the solvents in which the esterification reaction can be conducted may be mentioned benzene, toluene, xylene and the like. Usually they are employed in amounts ranging from 2 to 10 percent by weight of the total weight of the reactants in the reaction mixture.

The monomeric vinyl compounds that react with the polysiloxanes and polyesters to form the copolymers of our invention are those monomers represented by the general formula:

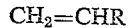

$$CH_2=CHR$$

wherein R is a negative group having an unsaturated carbon to carbon, carbon to oxygen, or carbon to nitrogen group in conjugation with the vinyl group. Groups having such unsaturation in conjugation with the vinyl group are aryl, ketonic, heterocyclic, nitrile, carbalkoxy, carboxy and amido.

Specific vinyl monomers having utility for the purposes of this invention and which illustrate "R" as aryl (or substituted aryl) include styrene, halogen substituted styrenes such as ortho chlorostyrene, para-iodo styrene, fluoro styrene, dichlorostyrene; alkyl substituted styrenes such as para ethyl styrene and tertiary butyl styrene; ethoxy styrene and para phenoxy styrene illustrate other substituted aryl groups; para-dimethyl amino styrene illustrates an amino substituted aryl group; vinyl biphenyl and vinyl napthalene illustrate aryl substituted aryl; ortho vinyl benzoic acid and orthovinyl phenyl acetic acid depict the carboxyl substituted aryl groups.

Vinyl monomers where "R" is ketonic are represented by ethyl vinyl ketone, propyl vinyl ketone and phenyl vinyl ketone. "R" as a heterocyclic group is typified by 2-vinyl pyridine, 2-vinyl quinoline, vinyl pyrrole, vinyl carbazole and vinyl thiophene.

"R" as nitrile is represented solely by acrylonitrile, and similarly "R" as carboxy or amido typify only acrylic acid and acrylamide respectively.

"R" as carbalkoxy include as useful specific vinyl monomers the alkyl acrylates such as methyl acrylate, butyl acrylate, octyl acrylate, lauryl acrylate and cyclohexyl acrylate, and aryl acrylates such as phenyl acrylate and aralkyl acrylates such as benzyl acrylate.

The copolymerization process by which the organo polysiloxane copolymers are produced is conducted by admixing the above-described reactants comprising an organo polysiloxane containing reactive vinyl groups, a polyester containing an average of between 0.1 and 1.0 alpha, beta unsaturated dicarboxylic acid residues per polyester molecule and a monomeric vinyl compound in the presence of a suitable solvent such as toluene or xylene and also in the presence of a free radical producing catalyst and heating the mixture whereby the reactants copolymerize.

Where desired ultra violet light can be used to catalyze the copolymerization reaction.

The organo polysiloxane copolymers of this invention are viscous liquids as prepared in the presence of an organic solvent and are solids when the solvent is removed.

Generally, the ratio of each reactant varies, as follows:

Polysiloxanes, from about 30–70% by weight,
Polyester, from about 25–65% by weight, and
Vinyl monomer, from about 5–25% by weight.

The exact amounts of reactant will vary between the above-noted limits depending upon the intended use of the copolymers. Generally, when the copolymer is to be used as a coating material which is to be subject to severe thermal conditions, a high proportion of the organo polysiloxane is used. Where it is desired to prepare a coating material from the copolymers of this invention, wherein the heat stability would be subordinate to the weather resistant qualities, a high proportion of polyester polymer and vinyl monomer should be used.

However, the amount of each component is usually kept within the aforementioned ranges. More than about 70 parts by weight polysiloxane by weight of the starting materials produces a copolymer which, when used as a coating material, is excessively brittle. Using less than about 30 parts by weight organo polysiloxane produces a coating material having an exceedingly low heat stability. Coating compositions prepared from copolymers in which the vinyl monomer is present in an amount greater than 25 parts by weight of the starting materials are exceedingly brittle while less than about 5 parts vinyl monomer produces a non-homogeneous combination of the polyester polymer and the organo polysiloxane as indicated by a separation of the product into layers.

Particularly desirable copolymers have been produced when the starting materials are in the following relative amounts.

| Starting materials: | Parts by weight |
|---|---|
| Organopolysiloxane | 40–60 |
| Polyester polymer | 30–50 |
| Vinyl monomer | 5–15 |

Coating compositions prepared from copolymers comprising the reactants of my invention in the above-noted ratios have exceptionally good color and gloss retention, and can be cured in short baking cycles as they are capable of withstanding heat on the order of 210° C.

The solvent in which the copolymerization reaction is conducted may be any liquid in which the starting materials and final product are soluble and which is non-reactive with the starting materials and final product. Illustrative of such solvents may be noted the aromatic hydrocarbons such as toluene, benzene, xylene, ethyl benzene and the like; ketones such as methyl isobutyl ketone, methyl isopropyl ketone, methyl ethyl ketone, acetone, diethyl ketone and acetophenone.

The amount of solvent used is at least about 10% by weight based on the total weight of the reactants. About 10 percent solvent insures that no gelation takes place in the copolymerization reaction. Adding a small amount of a compound containing an allyl group, such as dipentene, to the reaction mixture, in amounts as low as 1 part per 100 parts of reactants has also proved effective in preventing gelation of the copolymer.

The copolymerization process is normally conducted under reflux at temperatures ranging from about 125°–150° C. for about 5 to 7 hours. Below a temperature of about 125° C. the reaction is too slow to be practical. At a temperature of above about 150° C., the free radical producing catalysts decompose at an extremely rapid rate which inhibits their catalyzing the reaction effectively.

The copolymerization reaction in the presence of a solvent can be safely accelerated by the use of catalysts which are capable of yielding free radicals at the reaction temperature. The peroxide catalysts meet this requirement and particularly di-tertiary-butyl peroxide, cumene hydro peroxide and the like which have a reasonable duration (half-life) at reaction temperatures as high as 125°–150° C. In general, the peroxides have been found to reduce the reaction time for substantially complete copolymerization of all the original charged weight of vinyl monomer in a reaction mixture to a time cycle of about 5–12 hours.

Catalysts other than the peroxide type which have been found to promote the reaction include diazoaminobenzene, tetraphenyl hydrazine, and azo-bis-isobutyro-nitrile; of these, the tetraphenyl hydrazine was the least efficient whereas the other two promoted a copolymerization rate substantially the same as many of the peroxides.

In addition to the peroxide catalysts hitherto specifically identified, other peroxide catalysts found to be effective in promoting the copolymerization reaction are benzoyl peroxide, p-chlorobenzoyl peroxide, t-butyl perbenzoate, t-butyl perphthalic acid, t-butyl hydroperoxide, bis(t-butyl peroxy)butane, methyl amyl ketone peroxide and dibenzal diperoxide.

Ultra violet light may also be used effectively to catalyze the copolymerization reaction.

The peroxides and other catalysts, yielding free radicals by thermal decomposition, even when employed in small amounts of the total charge of reactions, catalyze a vigorous exothermic reaction. For this and economic reasons, the catalysts are used in small quantities, generally less than about 5 percent by weight based on the weight of the reactants. Generally, as little as ½ percent by weight is sufficient to catalyze the reaction. Furthermore, the total amount of catalyst is more effectively employed by adding it in small increments as the reaction proceeds.

The copolymerization reaction is substantially complete in about 5–7 hours at about 150° C. Completeness of the reaction is indicated by substantial conversion of the vinyl monomer to copolymer solids as indicated by a conventional quantitative analysis based on the weight of starting materials and the weight of the final product.

The following examples further illustrate our invention:

EXAMPLE I

(a) Preparation of the Organo Polysiloxane

A mixture of 190 grams (0.90 mole) of phenyl trichlorsilane, 48.5 grams (0.30 mole) of vinyl trichlorosilane and 152.8 grams (0.80 mole) of methylphenyldichlorosilane was dissolved in 310 cc. of ethyl ether. The resultant solution was added drop-wise, over a period of 1.25 hours and with agitation, to a mixture of 620 cc. of ethyl ether and 1000 cc. of distilled water contained in a three-liter flask equipped with a stirrer, reflux condenser and thermometer. The mixture of silanes had the following ratios of hydrocarbon groups to silicon atoms: alkyl:Si=0.4:1; aryl:Si=0.85:1; vinyl:Si=0.15:1; ratio of total hydrocarbon groups:Si=1.4:1. The temperature of the mix during the addition of the silanes was kept between 20–25° C. The mixture was agitated for 20–30 minutes after the addition of the silanes was completed and the mixture transferred to a separatory funnel. The water layer was then separated off and the ether solution washed twice with water. After each washing step, the water was separated from the ether solution. The ether solution was transferred back to the three-liter flask and distilled off under a slight vacuum at a residue temperature of 65° C.; 82 grams of toluene were then added to the residue and the resulting toluene solution refluxed for three hours at which point the pot temperature was 100°–110° C.

The solution was filtered and adjusted to a solids content of 74.5 percent by weight per 100 parts by weight solution by the addition of xylene. The solution had a viscosity of 100–200 centistokes at 25° C.

(b) Preparation of Polyester Polmer 665.4 grams (3.0 equivalents) coconut fatty acids, 310 grams of a mixture comprising 98 percent by weight of glycerol and 2 percent by weight water, 408.0 grams phthalic anhydride, 23.5 grams maleic anhydride, and 104 grams xylene were charged into a two-liter, three-necked flask equipped with a stirrer, thermometer, sampling tube, inert gas inlet, water trap and reflux condenser.

The mixture was refluxed at a temperature of between 160°–165° C. under an inert gas, $CO_2$, atmosphere.

The water which was formed was drawn off as it separated in the trap. The temperature of the reaction mixture gradually rose to between 190°–200° C. as the esterification proceeded. After refluxing for four hours, the reaction mixture was sampled to determine its acid number.

Refluxing was continued for another 2.5 hours until an acid number of 21.2 on the solids basis was obtained.

The mixture was allowed to cool to room temperature. The polyester polymer had a maleic acid functionality (G) of 0.318. The yield of the polyester polymer was 1400 grams which was 99.8% of the theoretical yield.

(c) Preparation of the Organo Polysiloxane Copolymer 134 grams of the organo polysiloxane solution of Example I(a), 87 grams of the polyester solution of Example I(b), 20 grams of styrene and 8.8 grams of xylene were charged into a ½-liter flask that was equipped with a stirrer, reflux condenser, and thermometer.

The mixture was heated to reflux and 0.48 cc. of cumene hydroperoxide added. One hour after the first addition, a second increment of 0.48 cc. of cumene hydroperoxide was added and 4 subsequent hourly increments of 0.48 cc. were thereafter added. One hour after the sixth and final cumene hydroperoxide increment was added, the reaction mixture was diluted with 48 grams of xylene and cooled to room temperature. The final solids content was 64.3 parts of solids by weight per each 100 parts by weight solution. The ratio of polysiloxane: polyester:styrene was 50–40–10. The reaction mixture was a clear amber solution.

EXAMPLE II

(a) Preparation of Organo Polysiloxane

A mixture of 148 grams (0.70 mole) of phenyltrichlorosilane, 48.5 grams (0.30 mole) of vinyltrichlorosilane, 69.5 grams (0.50 mole) of dimethyldichlorosilane, 126.5 grams (0.50 mole) diphenyldichlorosilane and 320 cc. anhydrous ethyl ether was added drop-wise over a period of 1.25 hours to a mixture of 600 cc. of ether and 1000 cc. of distilled water in a three-liter flask, equipped with a stirrer, reflux condenser, and thermometer. The mixture of silanes had the following ratios of hydrocarbon groups to silicon atoms: alkyl:Si=0.5:1; aryl:Si=0.85:1; vinyl: Si=1.5:1; and sum of all hydrocarbon groups:Si=1.5:1. The temperature was maintained at 20°–25° C. and the stirring continued for thirty minutes after addition of the silanes was completed. The water layer was separated off and the ether solution washed two to three times with water. The water was separated off after each addition. The ether solution was concentrated by heating it to a temperature of 65° C. to volatilize the solvent and produce a residue. Then 105 grams of toluene were added to the residue and the toluene solution was refluxed for 2.5 hours. The pot temperature was 117° C. The solution was filtered and adjusted to 69.2 percent solids by addition of xylene. The viscosity of the solution was 100–200 centistokes at 25° C.

(b) *Preparation of Polyester*

The polyester used was that of Example I(b).

(c) *Preparation of Organo Polysiloxane Copolymer*

One hundred forty-four grams of the organo polysiloxane solution of Example II(a) was admixed with 87 grams of the polyester polymer solution of Example II(b), and 20 grams of styrene. The mixture was copolymerized by the procedure described in Example I(c). The resultant product was a slightly opalescent solution. The ratio of polysiloxane:polyester:styrene was 50–40–10. The solids content was 78 parts of solids by weight per each 100 parts by weight solution.

EXAMPLE III (a) *Preparation of Organo Polysiloxane*

A mixture of 105.7 grams (0.50 mole) of phenyltrichlorosilane, 48.5 grams (0.30 mole) vinyltrichlorosilane, 77.5 grams (0.60 mole) dimethyldichlorosilane, 152 grams (0.60 mole) diphenyldichlorosilane, and 320 cc. anhydrous ethyl ether was slowly added during the course of 1.25 hours to a mixture of 600 cc. ether, 960 cc. water, and 40 cc. ethyl alcohol. The mixture of silanes had the following ratios of combined groups and atoms: Alkyl:Si=0.6:1; aryl:Si=0.85:1; vinyl:Si=1.5:1; and the sum of the hydrocarbon groups:Si=1.6:1. The temperature was maintained at 20°–25° C. The organo polysiloxane was recovered in a manner similar to that described in Example II(a). The organo polysiloxane solution in toluene contained 68.2 parts of solids per 100 parts by weight of the solution. The viscosity of the solution was 100–200 centistokes at 25° C.

(b) *Preparation of the Polyester*

The polyester of Example I(b) was used.

(c) *Preparation of Organo Polysiloxane Copolymer*

A mixture of 145.5 grams of an organo polysiloxane prepared as described in Example III(a) was admixed and copolymerized with 87 grams of a polyester solution of Example III(b) and 20 grams of styrene, in a manner as described in Example III(a). The resultant copolymer was a clear amber colored solution containing 65 parts by weight of solids per 100 parts by weight of solution. The ratio of polysiloxane:polyester:styrene was 50–40–10.

EXAMPLE IV (a) *Preparation of the Organo Polysiloxane*

A mixture of 190.38 grams (0.90 mole) phenyltrichlorosilane, 48.45 grams (0.3 mole) vinyltrichlorosilane, 202.53 grams (0.80 mole) diphenyldichlorosilane and 350 cc. anhydrous ethyl ether was hydrolyzed and condensed in a manner similar to that described in Example I(a). The mixture of silanes had the following ratios of combined groups and atoms: Alkyl:Si=0:1; aryl:Si=1.25:1; vinyl:Si=0.15:1; and sum of the hydrocarbon groups: Si=1.4:1. The resultant polysiloxane was a clear, amber colored solution of 75 percent solids content.

(b) *Preparation of the Polyester*

The polyester of Example I(b) was used.

(c) *Preparation of the Organo Polysiloxane Copolymer*

A mixture of 160 grams of the organo polysiloxane solution of Example IV(a), 69.6 grams of the polyester polymer solution of Example I(b), and 16 grams of styrene was copolymerized in a manner similar to that described in Example I(c). The resulting copolymer solution in xylene was a clear, amber colored solution and had 65 parts by weight of solids per 100 parts by weight of the solution. The ratio of polysiloxane:alkyd resin:styrene was 60–32–8.

EXAMPLE V (a) *Preparation of Polysiloxane*

The polysiloxane of Example IV(a) was used.

(b) *Preparation of the Polyester*

To a two-liter, three-necked flask equipped with a stirrer, thermometer, sampling tube, inert gas inlet, water trap and reflux condenser were charged 646 grams (3.0 equivalents) coconut fatty acids, 310 grams of a mixture containing 98 parts by weight glycerol and 2 parts by weight of water per 100 parts by weight of the mixture, 408 grams phthalic anhydride, 23.5 grams of maleic anhydride, and 102.5 grams xylene.

The reaction was conducted in a similar manner to that described in Example I(b). The reaction product had an acid number of 20.9 on a solids basis, and a G value of 0.309. Yield was 98 percent of the theoretical yield. The solution contained a solids content of 86 percent by weight.

(c) *Preparation of the Organo Polysiloxane Copolymer*

A mixture of 106.5 grams of the organo polysiloxane solution of Example V(a), 69.7 grams of polyester polymer solution of Example V(b), 16 grams of styrene dissolved in 8 grams xylene, was copolymerized in a manner similar to that described in Example I(c). The resulting reaction product was a light, amber colored solution in xylene. The solution contained 65 parts by weight of solids per 100 parts by weight of the solution and about 627 centistokes viscosity at 25° C. The ratio of polysiloxane:polyester:styrene was 50–40–10.

EXAMPLE VI (a) *Preparation of the Organo Polysiloxane*

A mixture of 2368 grams (11.2 moles) phenyltrichlorosilane, 258.4 grams (1.6 moles) vinyltrichlorosilane and 2000 cc. isopropyl ether was added slowing to a mixture of 2000 cc. isopropyl ether and 400 cc. water. The mixture of silanes had the following ratios of hydrocarbon groups and silicon atoms: Alkyl:Si=0:1; aryl:Si=0.875:1; vinyl:Si=0.125:1; and total hydrocarbon groups:Si=1:1. The temperature was maintained at 20°–30° C. during the addition. The organo polysiloxane was recovered in a manner similar to that described in Example I(a). The product was a clear toluene solution containing 75.5 parts by weight of solids per 100 parts by weight of thes solution, and had a viscosity of 800 centistokes at 25° C.

(b) *Preparation of the Polyester*

The polyester of Example V(b) was used.

(c) *Preparation of the Organo Polysiloxane Copolymer*

A mixture of 105.5 grams of the organo polysiloxane solution of Example VI(a), 69.2 grams of the polyester polymer solution of Example VI(b), 16.0 grams styrene was copolymerized in xylene in a manner similar to that described in Example I(c). The resulting copolymer solution contained 64.0 parts by weight of solids per 100 parts by weight of solution and had a viscosity of 850 centistokes at 25° C. The ratio of polysiloxane:polyester:styrene was 50–40–10.

EXAMPLE VII

(a) Preparation of the Organo Polysiloxane

A mixture of 222.0 grams (1.05 moles) phenyltrichlorosilane, 24.2 grams (0.15 mole) vinyltrichlorosilane and 246 grams anhydrous ethyl ether was added slowly to a mixture of 650 cc. ethyl ether and 2000 cc. water while maintaining a temperature of about 15° C. The mixture of silanes had the following ratios of hydrocarbon groups and atoms: Alkyl:Si=0:1; aryl:Si=0.875:1; vinyl:Si=0.125:1; and total hydrocarbon groups:Si=1:1. The organo polysiloxane so produced was recovered in a manner similar to that described in Example I(a). The reaction product was a clear, resinous solution. The solution contained 72 parts by weight of solids per 100 parts by weight of solution, and had a viscosity of about 300 centistokes at 25° C.

(b) Preparation of the Polyester

A mixture of 840 grams (3.0 equivalents) soya fatty acids, 310 grams glycerol, 408 grams phthalic anhydride, 23.5 grams maleic acid and 118 grams xylene was charged into a two-liter flask equipped with stirrer, thermometer, sampling tube, inert gas inlet, water trap and reflux condenser. The reaction was conducted in a manner similar to that described in Example I(b). The product had an acid number of 17.3 and a G value of about 0.31, and a solids content of 92 percent by weight.

(c) Preparation of the Organo Polysiloxane Copolymer

A mixture of 126 grams of the organo polysiloxane solution of Example VII(a), 87 grams of the polyester polymer solution of Example VII(b), 20 grams styrene was copolymerized in 17 grams xylene in a manner similar to that described in Example I(c). The resulting copolymer solution contained 77.5 parts by weight of solids per 100 parts by weight of solution. The ratio of polysiloxane:polyester:styrene was 50–40–10.

EXAMPLE VIII

(a) Preparation of the Organo Polysiloxane

The polysiloxane used was the same as in Example VII(a).

(b) Preparation of the Polyester

A mixture of 803 grams (5.5 moles) 2-ethylhexane diol-1,3, 708 grams (4.85 moles) adipic acid, 14.7 grams (0.15 mole) maleic anhydride and 108 grams xylene was reacted in a manner similar to that described in Example I(b). The reaction product had a value of G of about 0.175 and the yield was about 98 percent of the theoretical yield. The polyester product had a solids content of 92 percent by weight.

(c) Preparation of the Organo Polysiloxane Copolymer

A mixture of 126 grams of organo polysiloxane of Example VII(a), 65 grams of polyester polymer of Example VIII(b), and 40 grams of styrene was copolymerized in 19 grams of xylene in a manner similar to that described in Example I(c). The resulting copolymer solution was very light colored (1–2 Gardner scale, 1933). The ratio of polysiloxane:polyester:styrene was 50–30–20. The resultant solution contained 82 parts by weight solids per 100 parts by weight solution.

EXAMPLE IX

(a) Preparation of the Organo Polysiloxane

A mixture of 317.3 grams (1.5 moles) phenyltrichlorosilane, 16.2 grams (0.1 mole) vinyltrichlorosilane and 333 grams anhydrous ether was added slowly to a mixture of 900 cc. ether and 2700 cc. water with stirring, maintaining a temperature below 20° C. The mixture of silanes had the following ratios of combined groups and atoms: Alkyl:Si=0:1; aryl:Si=0.94:1; vinyl:Si=0.06:1; the sum of hydrocarbon groups:Si=1:1. The organo polysiloxane was recovered in a manner described in Example I(a). The reaction product was a slightly hazy solution that contained 82.5 parts by weight of solids per 100 parts by weight of solution.

(b) Preparation of the Polyester

A mixture of 803 grams 2-ethylhexane diol-1,3, 694 grams adipic acid, 24.5 grams maleic anhydride and 108 grams xylene was reacted in a manner similar to that described in Example I (b). The reaction product had a G value of about 0.286, an acid number of 15.5 based on solids content, and a solids content of 92 percent by weight.

(c) Preparation of the Organo Polysiloxane Copolymer

A mixture of 121 grams of organo polysiloxane from Example IX(a), 87 grams of the polyester polymer of Example IX(b), and 20 grams styrene was copolymerized in 22 grams xylene in a manner similar to that described in Example I(c). The resulting copolymer solution was clear and homogeneous and contained 81.6 parts by weight of solids per 100 parts by weight of solution. The ratio of polysiloxane:polyester:styrene was 50–40–10.

EXAMPLE X

(a) Preparation of the Organo Polysiloxane

The organo polysiloxane of Example IX(a) was used.

(b) Preparation of the Polyester

The polyester of Example VII(b) was used.

(c) Preparation of the Organo Polysiloxane Copolymer

A mixture of 121 grams of the organo polysiloxane of Example X(a), 87 grams of the polyester polymer of Example X(b), and 20 grams styrene was copolymerized in 22 grams xylene in a manner similar to that described in Example I(c). The resulting copolymer solution was clear and homogeneous and contained 79.4 parts by weight of solids per 100 parts by weight of solution. The rate of polysiloxane:polyester:styrene was 50–40–10.

EXAMPLE XI

(a) Preparation of the Organo Polysiloxane

The organo polysiloxane of Example VI(a) was used.

(b) Preparation of the Polyester

In a two-liter, three-necked flask equipped with a stirrer, thermometer, sampling tube, inert gas inlet, water trap and reflux condenser a reaction mixture was formed containing: 427.4 parts by weight caprylic acid, 310 parts of a mixture containing 98 percent by weight of glycerol and 2 percent by weight of water, 422 parts by weight phthalic anhydride, 14.7 parts by weight maleic anhydride and 85.4 parts by weight xylene. The reaction was conducted in a similar manner to that described in Example I(b). The reaction product had an acid number of 17.5 on a solids basis, a value of G of about 0.237, and a solids content of 92 percent by weight.

(c) Preparation of the Organo Polysiloxane Copolymer

A mixture of 114.5 parts by weight organo polysiloxane solution of Example XI(a), 69.5 parts by weight of polyester polymer solution of Example XI(b), 16 parts by weight styrene was copolymerized in a manner similar to that described in Example I(c). The resulting clear, light-colored resin solution, adjusted to 65 parts by weight of solids per 100 parts by weight of solution by addition of xylene, had a viscosity of about 450 centistokes at 25° C. The ratio of polysiloxane:polyester:styrene was 50–40–10.

The copolymers of my invention are especially useful as coating compositions. The copolymer solution can be admixed with a pigment and thinned with a hydrocarbon solvent, such as xylene or toluene to reduce to a working viscosity and applied as a coating material in any conventional manner, for example, by spraying, dipping and the like.

Pigments that have been suitable include among others, titanium dioxide, zinc oxide, powdered aluminum, cadmium red, cadmium yellow, and phthalocyanine blue. An aluminum pigment also adds to the heat stability of the coating compositions.

Fillers such as asbestine, silica, and diatomaceous earth may also be added where desired.

The amounts of pigment, organic solvent, and filler materials added to the organo polysiloxane copolymers of this invention will vary and depend upon the type of coating desired.

The coating compositions prepared from the organo polysiloxane copolymers of our invention are further illustrated by the following examples:

EXAMPLE XII

A white enamel was prepared by grinding together 22 grams of the organo polysiloxane copolymer solution of Example III(c) with 13 grams of titanium dioxide and 5.5 grams of xylene in a conventional paint mill to a homogeneous composition. Steel panels were coated to a thickness of one mil with the enamel and air dried for 30 minutes. The coating dried to a tough, hard product having a good gloss. The panels were then heated for one-half hour at 200° C. in order to insure a complete curing of the coating composition. The thermal stabiltiy of the coating was tested by heating the coated panels for a period of 20 days at 200° C. At the end of the time, the coating exhibited no crazing and the gloss retention was good, thereby indicating excellent heat stability.

EXAMPLE XIII

An enamel was prepared by ball milling together 22 grams of the copolymer solution of Example IV(c) with 13 grams of titanium dioxide and 5 grams of xylene to a homogeneous composition. Steel panels were coated to a thickness of 1.5 mils with this composition and air dried for thirty minutes whereby the coating dried to a tough, hard film having a good gloss. The panels were then heated at 200° C. for one-half hour in order to insure a complete curing of the coating composition. The heat stability of the coating was tested by heating the coated panels for a period of 20 days at a temperature of 200° C. At the end of that time the coating exhibited no crazing and the gloss retention was good, thereby indicating excellent heat stability.

EXAMPLE XIV

An enamel was prepared by ball milling 110 grams of the organo polysiloxane copolymer solution of Example V(c) with 65 grams of rutile titanium dioxide and 250 grams of xylene to a homogeneous composition. Steel panels were coated to a thickness of 1.25 mils and air dried for one-half hour whereby the coating dried to a tough hard film having a good gloss. The panels were then heated at 200° C. for one-hour hour in order to insure a complete curing of the coating composition. The heat stability of the coating was tested by heating the coated panels over a period of 400 hours at 200° C. The weight loss of the coating after 24 hours was 11 percent by weight; after 100 hours the total weight loss was 16 percent by weight; after 200 hours the total weight loss was 19 percent by weight; after 300 hours the total weight loss was 18 percent by weight; and after 400 hours the total weight loss was 19 percent by weight. At the end of 400 hours the coating had a good gloss and exhibited no crazing.

The weight loss, the gloss retention, and the lack of crazing indicated that the coating had excellent heat stability.

EXAMPLE XV

An enamel was prepared by ball milling 110 grams of the organo copolymer solution of Example VI(c) with 65 grams of titanium dioxide and 25 grams of xylene to a homogeneous mixture. Panels of the automotive type steel were coated to a thickness of 1.5 mils and air dried for 30 minutes whereby the coating dried to a hard, tough film.

The panels were then heated for one-half hour at 200° C. in order to insure a complete curing of the coating composition. The heat stability of the coating was tested by subjecting the panels to a temperature of 200° C. for a period of 400 hours. The weight loss of the coating after 24 hours was 9 percent by weight; after 100 hours, the total weight loss was 13 percent by weight; 15 percent total weight loss after 200 hours; 16 percent total weight loss after 300 hours; and 17 percent total weight loss after 400 hours. At the end of 400 hours, the coating had a good gloss and exhibited no crazing.

The weight loss, gloss retention and lack of crazing indicated that the coating had excellent heat stability.

EXAMPLE XVI

The organo polysiloxane copolymer solution of Example VIII(c) was applied as a coating onto a metal surface. The coated surface was subjected to a temperature of 135° C. for one hour. The coating at the end of one hour was tough, hard and clear.

Other applications in which the organo polysiloxane copolymers for our invention may be used are the following: As electrical insulating material, sizing for fibrous material, and as water proof coatings.

What is claimed is:

1. A copolymer of from 40 to 60 percent by weight of an organo polysiloxane wherein any alkyl groups that are present are in an amount up to 0.6 alkyl groups per each silicon atom, the ratio of aryl groups to silicon atoms is from 0.75 to 1.25 per each silicon atom, the ratio of vinyl groups to silicon atoms is from 0.05 to 0.2 per each silicon atom, with the ratio of the total hydrocarbon groups to silicon atoms being from 1 to 1.6 per each silicon atom, from 30 to 50 percent by weight of a polyester containing an average of between 0.1 to 1.0 residue of an olefinically alpha, beta unsaturated dicarboxylic acid per polyester molecule said polyester having an acid number of less than 50 and from 5 to 15 percent by weight of a vinyl compound having the formula $CH_2=CHR$ wherein R is a group having unsaturation in conjugation with the $CH_2=CH—$ group and selected from the group consisting of aryl, heterocyclic, carbalkoxy, carboxy, ketonic, nitrile and amido.

2. A copolymer as defined in claim 1 wherein the vinyl compound is styrene.

3. A copolymer as defined in claim 1 wherein the polyester contains maleic acid residues.

4. A coating composition as defined in claim 7 wherein the vinyl monomer is styrene.

5. A coating composition as defined in claim 7 wherein the polyester contains maleic acid residues.

6. A coating composition as defined in claim 7 wherein the hydrocarbon solvent is xylene.

7. A coating composition comprising a solution in an hydrocarbon solvent of a copolymer of from 40 to 60 percent by weight of an organo polysiloxane wherein any alkyl groups that are present are in an amount up to 0.6 alkyl groups per each silicon atom, the ratio of aryl groups to silicon atoms is from 0.75 to 1.25 per each silicon atom, the ratio of vinyl groups to silicon atoms is from 0.05 to 0.2 per each silicon atom with the ratio of the total hydrocarbon groups to silicon atoms being from 0.75 to 1.25 per each silicon atom, from 30 to 50 percent by weight of a polyester containing an average of between 0.1 to 1.0 residue of an olefinically alpha, beta unsaturated dicarboxylic acid per polyester molecule said polyester having an acid number of less than 50, and from 5 to 15 percent by weight of a vinyl monomer having the formula $CH_2=CHR$ wherein R is a group having unsaturation in conjugation with the $CH_2=CH$-group and selected from the group consisting of aryl, heterocyclic, carbalkoxy, ketonic, nitrile, and amido.

References Cited in the file of this patent
UNITED STATES PATENTS

| | | |
|---|---|---|
| 2,724,704 | Millar | Nov. 22, 1955 |
| 2,742,378 | Te Grotenhuis | Apr. 17, 1956 |
| 2,746,942 | Sample | May 22, 1956 |
| 2,842,517 | Shorr | July 8, 1958 |
| 2,885,383 | Brooks | May 5, 1959 |
| 2,937,230 | Rogers | May 17, 1960 |